United States Patent
Yamashita et al.

(10) Patent No.: US 11,011,052 B2
(45) Date of Patent: May 18, 2021

(54) CONTROL SYSTEM AND CONTROL METHOD

(71) Applicant: FUJITSU LIMITED, Kawasaki (JP)

(72) Inventors: Koichiro Yamashita, Hachioji (JP); Takahisa Suzuki, Yokohama (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 15/948,292

(22) Filed: Apr. 9, 2018

(65) Prior Publication Data

US 2018/0225128 A1    Aug. 9, 2018

Related U.S. Application Data

(63) Continuation of application No. PCT/JP2015/078942, filed on Oct. 13, 2015.

(51) Int. Cl.
| | | |
|---|---|---|
| G08C 17/02 | (2006.01) | |
| H04L 29/08 | (2006.01) | |
| H04W 84/18 | (2009.01) | |
| H04W 4/38 | (2018.01) | |

(52) U.S. Cl.
CPC .............. G08C 17/02 (2013.01); H04L 67/12 (2013.01); H04W 84/18 (2013.01); H04W 4/38 (2018.02)

(58) Field of Classification Search
CPC ........ G06F 30/20; G06F 30/30; G06F 1/3228; G06F 1/3293; G06F 2209/509; G06F 8/4432; G06F 9/325
USPC ........... 707/600–831, 899, 999.001–999.206
See application file for complete search history.

(56) References Cited

U.S. PATENT DOCUMENTS

| | | | | |
|---|---|---|---|---|
| 8,037,123 | B2* | 10/2011 | Wei | G06F 9/4862 709/202 |
| 8,489,865 | B1* | 7/2013 | Rensch | G06F 9/30065 712/220 |
| 2003/0036359 | A1* | 2/2003 | Dent | H04B 7/005 455/63.1 |
| 2004/0092233 | A1* | 5/2004 | Rudrapatna | H04W 52/60 455/69 |

(Continued)

FOREIGN PATENT DOCUMENTS

| | | |
|---|---|---|
| JP | 2005-135289 | 5/2005 |
| JP | 2006-209457 | 8/2006 |

(Continued)

OTHER PUBLICATIONS

Japanese Office Action dated Jun. 18, 2019 in corresponding Japanese Patent Application No. 2017-545024.

(Continued)

*Primary Examiner* — Angelica Ruiz
(74) *Attorney, Agent, or Firm* — Staas & Halsey LLP

(57) ABSTRACT

A control system includes a server and a plurality of nodes. The server transmits data of command strings being described in combination of sequential processing and loop processing to the nodes. The nodes store the data of command strings received from the server. Each node includes a plurality of application programming interface (API) units that perform predetermined sequential processing. Each node selects an API unit on the basis of the command strings acquired from the server and causes the selected API unit to perform sequential processing and loop processing.

8 Claims, 12 Drawing Sheets

(56) References Cited

U.S. PATENT DOCUMENTS

| | | |
|---|---|---|
| 2005/0122233 A1 | 6/2005 | Isoyama et al. |
| 2006/0173995 A1 | 8/2006 | Moriwaki |
| 2006/0202834 A1 | 9/2006 | Moriwaki |
| 2006/0282498 A1 | 12/2006 | Muro |
| 2007/0171052 A1 | 7/2007 | Moriwaki |
| 2007/0255929 A1* | 11/2007 | Kasahara .............. G06F 1/3203 712/1 |
| 2008/0288636 A1 | 11/2008 | Moriwaki |
| 2010/0318598 A1* | 12/2010 | Yun .......................... G06F 9/54 709/203 |
| 2011/0110384 A1* | 5/2011 | Li ........................ H04B 1/711 370/479 |
| 2012/0307277 A1 | 12/2012 | Kishida |
| 2014/0245157 A1* | 8/2014 | Biniak ............... G06Q 30/0261 715/733 |
| 2015/0003138 A1* | 1/2015 | Wada .................... G11C 15/02 365/49.17 |
| 2015/0031381 A1 | 1/2015 | Kotecha et al. |
| 2015/0334132 A1* | 11/2015 | Zombik ................. H04L 41/28 726/1 |
| 2016/0142391 A1 | 5/2016 | Maegawa et al. |
| 2016/0357241 A1* | 12/2016 | Ramadoss ............ G06F 1/3228 |

FOREIGN PATENT DOCUMENTS

| | | |
|---|---|---|
| JP | 2006-244120 | 9/2006 |
| JP | 2006-260281 | 9/2006 |
| JP | 2006-344017 | 12/2006 |
| JP | 2007-156909 | 6/2007 |
| JP | 2010-203964 | 9/2010 |
| JP | 2012-253513 | 12/2012 |
| JP | 2015-35168 | 2/2015 |

OTHER PUBLICATIONS

International Search Report dated Dec. 28, 2015 in corresponding International Patent Application No. PCT/JP2015/078942.

Office Action dated Jun. 2, 2017 in corresponding Taiwanese Patent Application No. 105131587.

Written Opinion of the International Searching Authority dated Dec. 28, 2015 in corresponding International Patent Application No. PCT/JP2015/078942.

Chinese Office Action dated Apr. 2, 2020 for Chinese Patent Application No. 201580083736.2, 17 pages.

* cited by examiner

FIG.4 a1

Target: All end device
Command: Loop{
    Sensing
    Data send
    }every 20sec

FIG.5 a2

Target: All end device
Command: Seq
    Sleep 9min

FIG.6

```
                              b1
┌─────────────────────────────┐
│ Target: Node X              │
│ Command: Loop{              │
│     Sensing                 │
│     Data send               │
│     }every 60sec            │
│                             │
└─────────────────────────────┘
```

FIG.7

```
                              b2
┌─────────────────────────────┐
│ Target: All end device      │
│ Command: Seq                │
│     Sleep 9min              │
│                             │
│                             │
└─────────────────────────────┘
```

CONTROL SYSTEM AND CONTROL METHOD

CROSS-REFERENCE TO RELATED APPLICATION(S)

This application is a continuation of International Application No. PCT/JP2015/078942, filed on Oct. 13, 2015, the entire contents of which are incorporated herein by reference.

FIELD

The embodiment discussed herein is related to a control system and the like.

BACKGROUND

Recently, a monitoring technique of allowing a server to collect a verity of environmental information such as temperature and humidity using a wireless sensor network in which a plurality of nodes that perform wireless communication are arranged has been known. In general, the nodes are installed outdoors, and each node is operated with a battery and charges the battery using a solar panel.

In each node that is installed outdoors, since an amount of power remaining in the battery varies depending on change in weather or sunshine, software associated with an operation cycle of each node is appropriately changed such that power depletion is suppressed. In addition, software for operating each node may be appropriately changed in response to a request from a manager.

Patent Literature 1: Japanese Laid-open Patent Publication No. 2006-244120
Patent Literature 2: Japanese Laid-open Patent Publication No. 2006-209457
Patent Literature 3: Japanese Laid-open Patent Publication No. 2006-260281

However, in the related art, there is a problem in that costs for operating the system increase.

For example, when the nodes are installed in a wide range, it is desirable that software in each node which has been installed once continue to be operated without updating the software such that a burden on a manager is reduced. In order to realize this operation, software that can cope with combinations of all environments and operations which are considerable is installed in advance in the nodes or a software updating function using remote control as in a general-purpose personal computer (PC) is mounted in the nodes. However, since the software or the software updating function is complex and causes a large amount of mounted resources, costs for the nodes increase. Further, since quality of software deteriorates generally in proportion to an amount of software resources and a control volume thereof, the quality of software deteriorates when a complex operation is to be performed by software having a large amount of resources mounted in advance in the nodes.

On the other hand, when environment-resistant mounting is not performed but simple mounting which does not cope with a variation in operation is performed on the nodes, this mounting is not functionally suitable for nodes which are installed outdoors due to insufficient functions thereof.

An object of an aspect is to provide a control system and a control method that can prevent an increase in costs for operation of a system.

SUMMARY

According to an aspect of an embodiment, a control system includes a plurality of nodes that constitute a network; and a server, wherein the server comprises a processor that executes a process comprising: transmitting data of a command string being described in a combination of sequential processing and loop processing of repeatedly performing the sequential processing to the nodes, and each of the nodes comprises: a memory that stores the data of the command string received from the server; and a processor coupled to the memory, wherein the process executes a process comprising: selecting a plurality of application programming interface units that perform predetermined sequential processing on the basis of the command string stored in the memory; and causing the selected application programming interface units to perform sequential processing and loop processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a (first) diagram illustrating an example of a script corresponding to a control parameter A;
FIG. 5 is a (second) diagram illustrating an example of a script corresponding to the control parameter A;
FIG. 6 is a (first) diagram illustrating an example of a script corresponding to a control parameter B;
FIG. 7 is a (second) diagram illustrating an example of a script corresponding to the control parameter B.

DESCRIPTION OF EMBODIMENT(S)

Preferred embodiments of the present invention will be explained with reference to accompanying drawings. The present invention is not limited by the embodiment.

Figure 1:
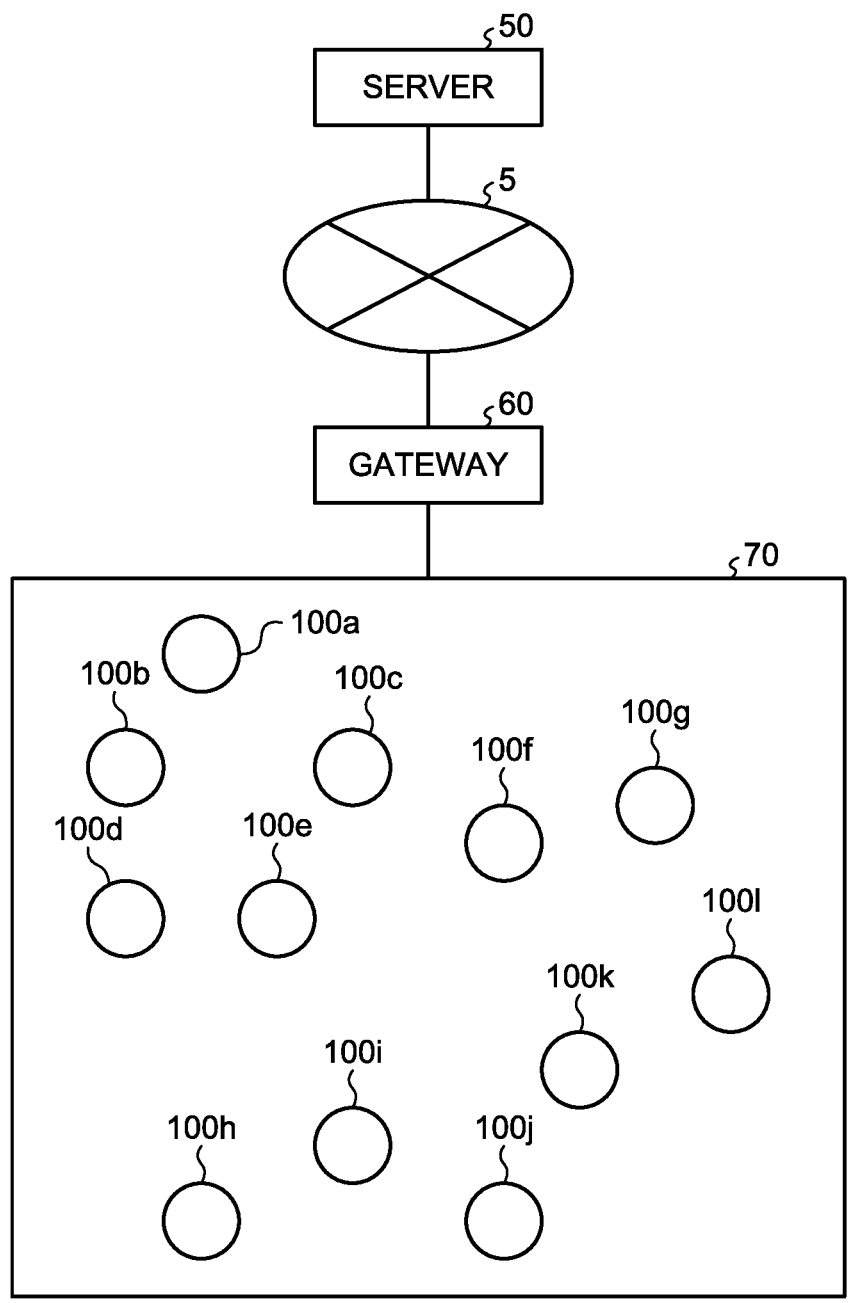
FIG. 1 is a diagram illustrating an example of a control system according to the present embodiment.

FIG. 1 is a diagram illustrating an example of a control system according to the present embodiment. As illustrated in FIG. 1, the control system includes a server 50, a gateway 60, and a sensor network 70. The sensor network 70 includes nodes 100a, 100b, 100c, 100d, 100e, 100f, 100g, 100h, 100i, 100j, 100k, and 100l. Here, the nodes 100a to 100l are described for example, but other nodes may be further provided. In the following description, the nodes 100a to 100l are collectively appropriately referred to as nodes 100.

The server 50 is connected to the gateway 60 via a network 5. The gateway 60 is connected to the sensor network 70. The nodes 100 included in the sensor network 70 are connected to each other by wireless communication.

The server 50 is a device that transmits information of command strings to the nodes 100. In the information, predetermined processing which is caused to be performed by the nodes 100 is described in a combination of sequential processing and loop processing.

The gateway 60 is a device that relays data which is transmitted and received between the server 50 and the sensor network 70.

The nodes 100 are installed outdoors, operate with a battery, and charge the battery with power using a solar panel. Each node 100 has only simple application programming interfaces (APIs), drivers, and a control structure of sequential processing/loop processing. The nodes 100 perform sequential processing and loop processing on the basis of command strings notified from the server 50.

The nodes 100 in the sensor network 70 are classified into joint nodes and leaf nodes depending on a difference in software functions. A joint node is a node 100 that serves as a joint of the sensor network 70 that relays data, receives data from a neighboring node connected thereto as a joint as well as transmitting its own data, and transmits the received data to another neighboring node. On the other hand, a leaf node is a node that transmits only its own data.

The joint node and the leaf node are different from each other in only setting of software, and any node 100 may serve as the joint node or the leaf node. However, there is a large difference between power consumption of the leaf node and power consumption of the joint node.

Figure 2:
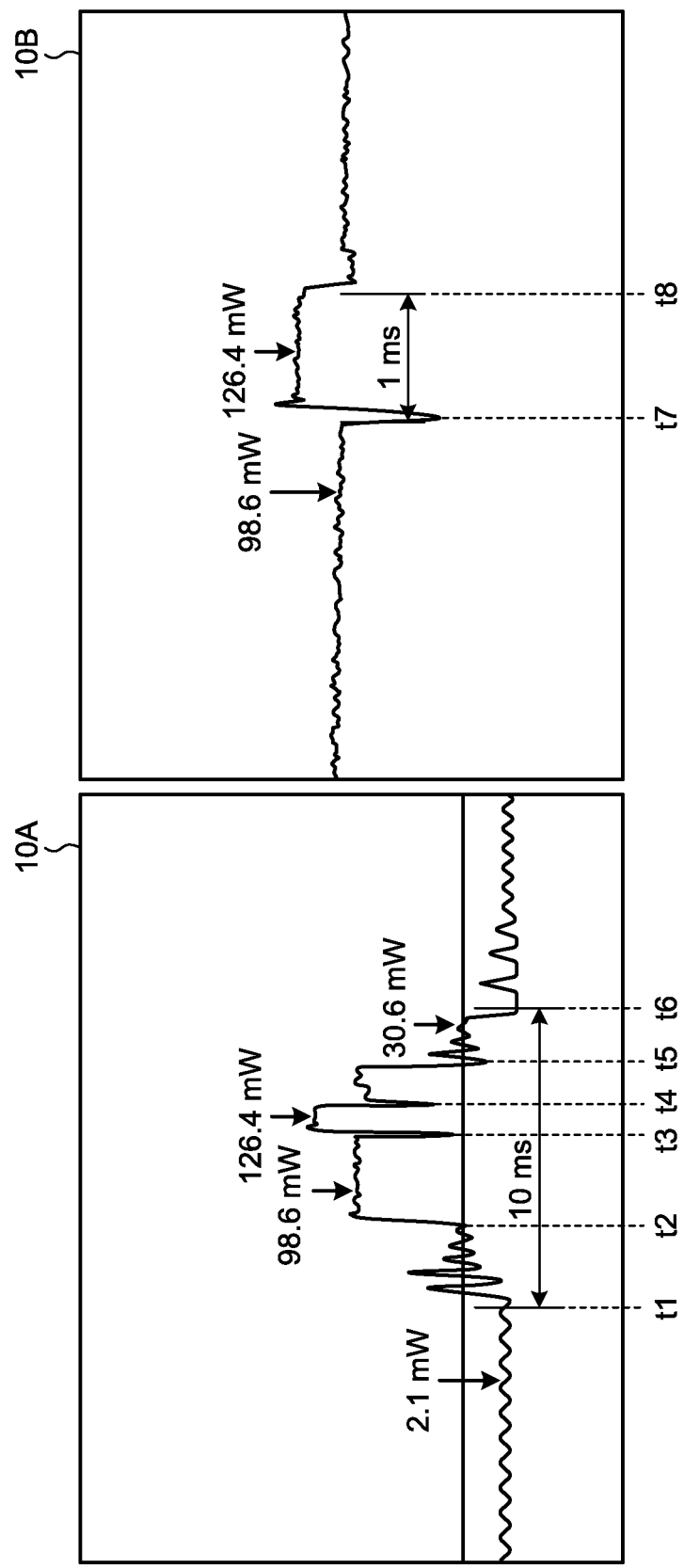
FIG. 2 is a diagram illustrating power consumption of a leaf node and power consumption of a joint node.

FIG. 2 is a diagram illustrating the power consumption of the leaf node and the power consumption of the joint node. In FIG. 2, a graph 10A represents an example of a power waveform of the leaf node, where a vertical axis represents power and a horizontal axis represents time. A graph 10B represents an example of a power waveform of the joint node, where the vertical axis represents power and the horizontal axis represents time.

The graph 10A will be described below. The leaf node is on standby from a certain time to time t1. Power consumption on standby is 2.1 mW. The leaf node performs a process of acquiring data from a sensor which is installed in the leaf node from time t1 to time t2. The leaf node performs a data transmission preprocess from time t2 to time t3. The power consumption when the data transmission preprocess is performed is 98.6 mW. The leaf node performs transmission of data from time t3 to time t4. The power consumption during the transmission of data is 126.4 mW. The leaf node performs a post-process from time t5 to time t6. At a certain time of the post-process, the power consumption is 30.6 mW. The leaf node becomes on standby again after time t6.

The graph 10B will be described below. The joint node waits for reception of data from a neighboring node from a certain time to time t7. The power consumption when the joint node waits for reception of data is 98.6 mW. The joint node performs transmission of data from time t7 to time t8. The power consumption during the transmission of data is 126.4 mW.

Comparing the graph 10A and the graph 10B, for example, in the leaf node, the power consumption increases for about 10 ms from time t1 at which acquisition of data from a sensor is started to time t6 at which the post-process is completed, but the power consumption at the other times decreases. On the other hand, the power consumption of the joint node is normally large.

The nodes 100 constituting the sensor network 70 are installed outdoors and perform power generation using a solar panel and charging using a battery. Since power consumption of the joint node is large, there is a high likelihood that power of a joint node will be depleted in bad weather or when the node 100 is located in the shade.

Here, a control algorithm can be constructed in consideration of the weather or the shade conditions and in consideration of unbalance in power consumption due to the topology of the sensor network 70 serving as a leaf or a joint. However, in an actual natural environment, complicated factors are entangled and there may be an event which is not known unless actual operation is performed. Accordingly, it is difficult to cause the nodes 100 to independently operate in accordance with a simple control algorithm of "temporarily stopping because a power threshold value is less than PP on the basis of conditions of XX, YY, and ZZ."

Figure 3:
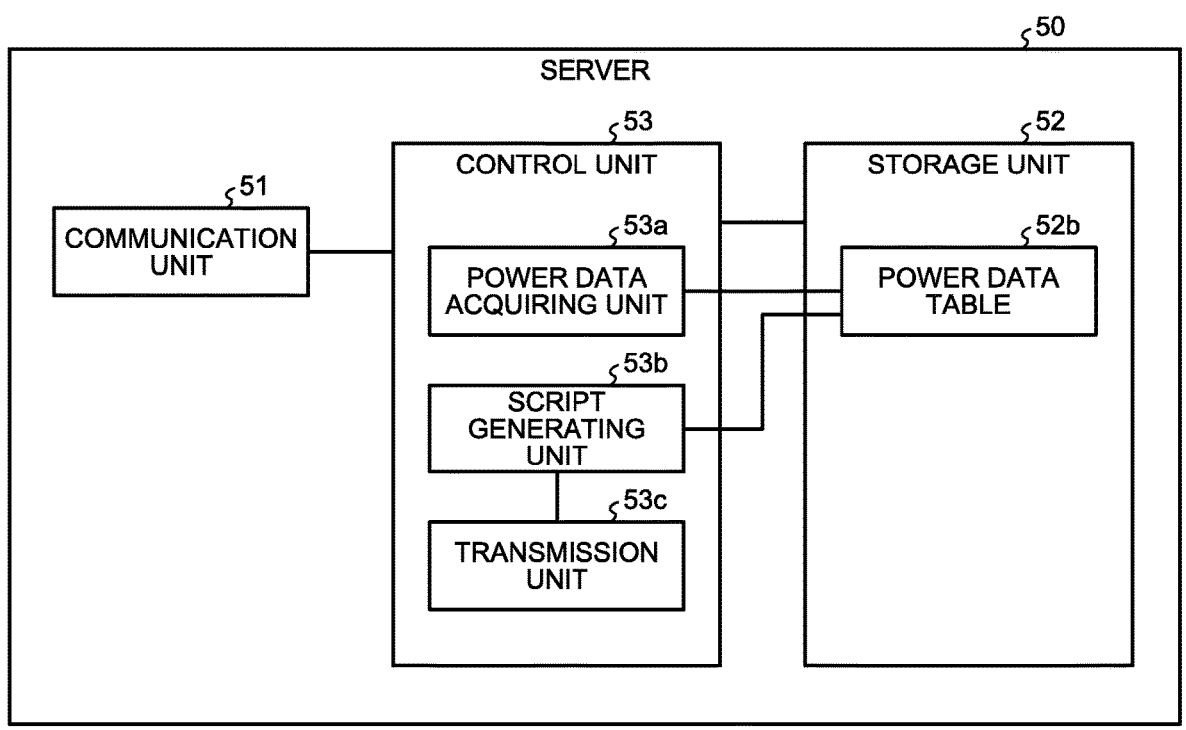
FIG. 3 is a functional block diagram illustrating a configuration of a server according to the present embodiment.

Next, the configuration of the server 50 illustrated in FIG. 1 will be described below. FIG. 3 is a functional block diagram illustrating the configuration of the server according to the present embodiment. As illustrated in FIG. 3, the server 50 includes a communication unit 51, a storage unit 52, and a control unit 53.

The communication unit 51 is a processing unit that performs data communication with the nodes 100 of the sensor network 70 via the network 5 and the gateway 60. The communication unit 51 corresponds to, for example, a communication device. The control unit 53 which will be described later transmits and receives data to and from the nodes 100 of the sensor network 70 via the communication unit 51.

The storage unit 52 includes a power data table 52b. The storage unit 52 corresponds to a storage device such as a semiconductor memory device such as a random access memory (RAM), a read only memory (ROM), or a flash memory.

The power data table 52b is a table in which identification information for uniquely identifying the nodes 100 is stored in correlation with power data. For example, power data is information of an amount of power accumulated in the battery of each node 100.

The control unit 53 includes a power data acquiring unit 53a, a script generating unit 53b, and a transmission unit 53c. The control unit 53 corresponds to, for example, an integrated device such as an application specific integrated circuit (ASIC) or a field programmable gate array (FPGA). The control unit 53 corresponds to, for example, an electronic circuit such as a CPU or a micro-processing unit (MPU).

The power data acquiring unit 53a is a processing unit that acquires power data from the nodes 100. The power data acquiring unit 53a stores the power data acquired from the nodes 100 in the power data table 52b in correlation with the identification information of the nodes 100.

The script generating unit 53b is a processing unit that generates predetermined processing which is performed by the nodes 100 as information of command strings. The command strings is described in a combination of sequential processing and loop processing of repeatedly performing the sequential processing. For example, the command string is described in, for example, a script language. In the following description, a command string generated by the script generating unit 53b is appropriately referred to as a script. The script generating unit 53b outputs information of the script to the transmission unit 53c.

The transmission unit 53c is a processing unit that transmits the information of the script received from the script generating unit 53b to the nodes 100 of the sensor network 70. In the following description, information of a script is appropriately referred to as script information.

Next, information of the command string which is generated by the script generating unit 53b will be described in detail.

First, a script which is transmitted by the server 50 when the nodes 100 of the sensor network 70 are operated as a default will be described below. Information of a control parameter A constituting a default operation state of the sensor network 70 includes A1, A2, and A3 which will be described below.

A1: Sampling is performed every 20 seconds.
A2: A state of A1 is maintained for one minute.
A3: A dormant state is set for nine minutes.

The script generating unit 53b of the server 50 generates a script corresponding to the control parameter A when the sensor network 70 is operated in the default operation state. The script corresponding to the control parameter A includes a script a1 illustrated in FIG. 4 and a script a2 illustrated in FIG. 5. FIGS. 4 and 5 are diagrams illustrating examples of the script corresponding to the control parameter A.

The first row of the script a1 illustrated in FIG. 4 indicates the nodes 100 that execute a command. The first row is "Target: All end device" and the nodes 100 that execute the command are all leaf nodes included in the sensor network 70. Details of the second to fifth rows of the script a1 mean that "a process of {sensing→transmitting sensed data} is performed every 20 seconds." The leaf nodes acquiring the script a1 perform sensing every 20 seconds and transmit the sensed data to the server 50.

The first row of the script a2 illustrated in FIG. 5 indicates the nodes 100 that execute a command. The first row is "Target: All end device" and the nodes 100 that execute the command are all leaf nodes included in the sensor network 70. Details of the second and third rows of the script a2 mean that "sleep for nine minutes." For example, the nodes 100 that is performing a loop operation on the basis of the script a1 is in a sleep state for nine minutes from the time at which the script a2 is received and returns to the loop operation based on the script a1 again after getting out of the sleep state.

Note that the transmission unit 53c can cause the nodes 100 to perform the following processes by transmitting the script a2 every 10 minutes after transmitting the script a1 to the nodes 100. That is, the nodes 100 continue to perform processing of performing the process of transmitting sensed data to the server 50 every 20 seconds for one minute. The nodes 100 are in a sleep state for nine minutes and then perform sampling every 20 seconds again.

Next, a script transmitted to a node 100 which is likely to deplete power by the server 50 will be described below. Here, the node 100 which is likely to deplete power is defined as a node 100X. The node 100X corresponds to one of the nodes 100a to 100l illustrated in FIG. 1. When the server 50 stops the node 100X, node missing occurs and a problem with a missing tooth occurs topologically. Accordingly, the server 50 continues to operate the node 100X as continuous as possible.

For example, the server 50 determines an expected reset value from temporary power generation failure from statistical information of the power generation states of the nodes 100 or how to operate the node 100X on the basis of a time of sunrise or sunset to release the power depletion state of the node 100X.

For example, the script generating unit 53b of the server 50 generates a script of command strings for thinning out the number of sampling times in one cycle operation from three to one. By this script, the power consumption of the node 100X is reduced to ⅓ and the time until the power of the node 100X is depleted is extended. For example, when the operations illustrated in FIGS. 4 and 5 are continuously performed, the power is depleted before the sunrise, but the node can continue to perform the operations until the sunrise by thinning out the number of samplings. By sunshine thereafter, a battery of the node 100X is charged with power and the risk of power depletion can be solved.

For example, information of a control parameter B which is transmitted to the node 100X to prevent power depletion includes B1, B2, and B3 which will be described below.

B1: Sampling is performed every 60 seconds.
B2: A state of B1 is maintained for one minute.
B3: A dormant state is set for nine minutes.

The script generating unit 53b of the server 50 generates a script corresponding to the control parameter B. The script corresponding to the control parameter B includes a script b1 illustrated in FIG. 6 and a script b2 illustrated in FIG. 7. FIGS. 6 and 7 are diagrams illustrating examples of the script corresponding to the control parameter B.

The first row of the script b1 illustrated in FIG. 6 indicates the nodes 100 that execute a command. The first row is "Target: Node X" and the node 100 that executes the command is the node 100X included in the sensor network 70. Details of the second to fifth rows of the script b1 mean that "a process of {sensing→transmitting sensed data} is performed every 60 seconds." The node 100X acquiring the script b1 performs sensing every 60 seconds and transmits the sensed data to the server 50.

The first row of the script b2 illustrated in FIG. 7 indicates the nodes 100 that execute a command. The first row is "Target: Node ALL end device" and the nodes 100 that execute the command are all the nodes 100 included in the sensor network 70. Details of the second and third rows of the script b2 mean that "sleep for nine minutes." For example, the node 100X that is performing a loop operation on the basis of the script b1 is in a sleep state for nine minutes from the time at which the script b2 is received and returns to the loop operation based on the script b1 again after getting out of the sleep state.

Note that the transmission unit 53c can cause the node 100X to perform the following processes by transmitting the script b2 every 10 minutes after transmitting the script b1 to the node 100X. That is, the node 100X continues to perform processing of performing the process of transmitting sensed data to the server 50 every 60 seconds for one minute. The node 100X is in a sleep state for nine minutes and then performs sampling every 60 seconds again.

In the above-mentioned example, the transmission unit 53c transmits the scripts b1 and b2 to the node 100X which is likely to deplete power to prevent power depletion, but the transmission unit 53c may transmit another script to the node 100X. For example, when the node 100X has a role of a joint node, the transmission unit 53c may suppress power consumption by changing the role of the node 100X to a leaf node.

Here, for example, when an amount of power in the node 100X is less than a threshold value, the server 50 determines that the power of the node 100X is likely to be depleted. For example, the server 50 may set the threshold value on the basis of the following Considerations 1 to 5.

Consideration 1: Whether the state in which a threshold value is crossed is based on operation in continuous joint nodes.

Consideration 2: Whether power generation conditions deteriorate due to sunset and power generation is expected in the morning of the next day.

Consideration 3: Whether power generation conditions deteriorate due to sudden change in weather.

Consideration 4: Whether the node is installed in shadow from the start and power generation conditions are normally bad.

Consideration 5: Combination of Considerations 1 to 4 with whether the node is a leaf node or a joint node.

Next, a case in which the server 50 classifies the nodes 100 into a plurality of groups and transmits different scripts by groups will be described. For example, the server 50 changes role assignment of a leaf node and a joint node for each group. By changing the role assignment of the leaf node and the joint node for each group, it is possible to solve deviation in power consumption of the nodes 100.

Figure 8:
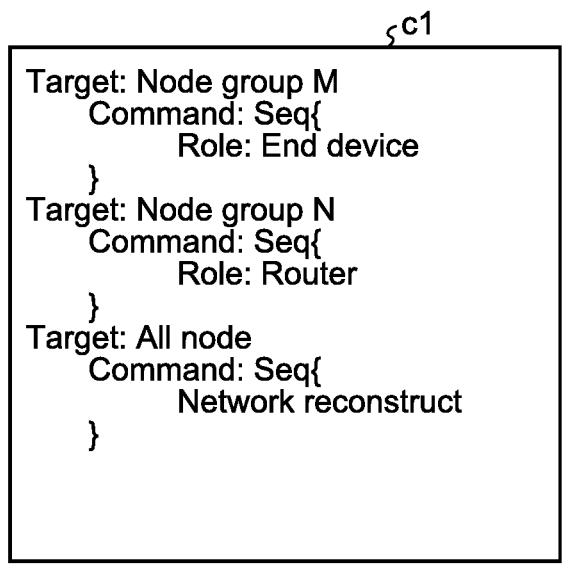
FIG. 8 is a (first) diagram illustrating an example of a script for setting roles of nodes.
Figure 9:
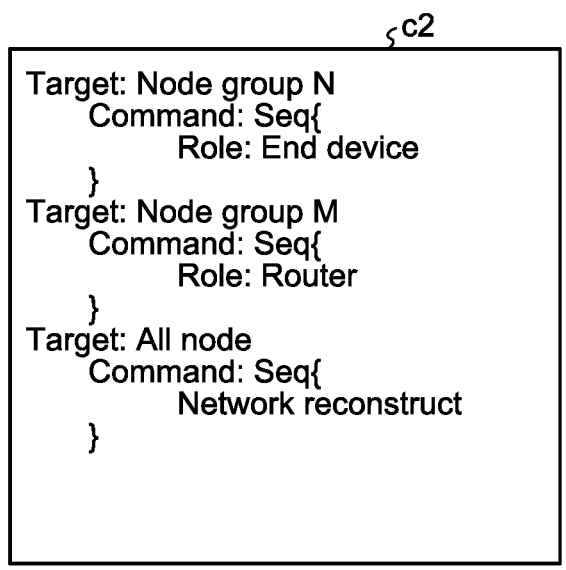
FIG. 9 is a (second) diagram illustrating an example of a script for setting roles of nodes.

Here, it is assumed that the nodes 100 be classified into group M or group N. FIGS. 8 and 9 are diagrams illustrating an example of a script for setting a role of each node.

The first row of a script c1 illustrated in FIG. 8 indicates the nodes 100 that execute commands of the second to fourth rows. The first row is "Target: Node group M," and the nodes 100 that execute the commands are the nodes 100 which belong to group M of the sensor network 70. Details of the second to fourth rows of the script c1 mean that "the roles of the nodes 100 are set to leaf nodes (end device)." That is, the nodes 100 belonging to group M set their roles to the leaf node when the script c1 is received.

The fifth row of the script c1 indicates the nodes 100 that execute commands of the sixth to eighth rows. The fifth row is "Target: Node group N," and the nodes 100 that execute the commands are the nodes 100 which belong to group N of the sensor network 70. Details of the sixth to eighth rows of the script c1 mean that "the roles of the nodes 100 are set to joint nodes (router)." That is, the nodes 100 belonging to group N set their roles to the joint node when the script c1 is received.

The ninth row of the script c1 indicates the nodes 100 that execute commands of the tenth to twelfth rows. The ninth row is "Target: All node," and the nodes 100 that perform the commands are all the nodes 100 included in the sensor network 70. Details of the tenth to twelfth rows of the script c1 mean that "the network is reconstructed."

The first row of a script c2 illustrated in FIG. 9 indicates the nodes 100 that execute commands of the second to fourth rows. The first row is "Target: Node group N," and the nodes 100 that perform the commands are the nodes 100 which belong to group N of the sensor network 70. Details of the second to fourth rows of the script c2 mean that "the roles of the nodes 100 are set to leaf nodes (end device)." That is, the nodes 100 belonging to group N set their roles to the leaf node when the script c2 is received.

The fifth row of the script c2 indicates the nodes 100 that execute commands of the sixth to eighth rows. The fifth row is "Target: Node group M," and the nodes 100 that perform the commands are the nodes 100 which belong to group M of the sensor network 70. Details of the sixth to eighth rows of the script c2 mean that "the roles of the nodes 100 are set to joint nodes (router)." That is, the nodes 100 belonging to group M set their roles to the joint node when the script c2 is received.

The ninth row of the script c2 indicates the nodes 100 that execute commands of the tenth to twelfth rows. The ninth row is "Target: All node," and the nodes 100 that perform the commands are all the nodes 100 included in the sensor network 70. Details of the tenth to twelfth rows of the script c2 mean that "the network is reconstructed."

Figure 10:
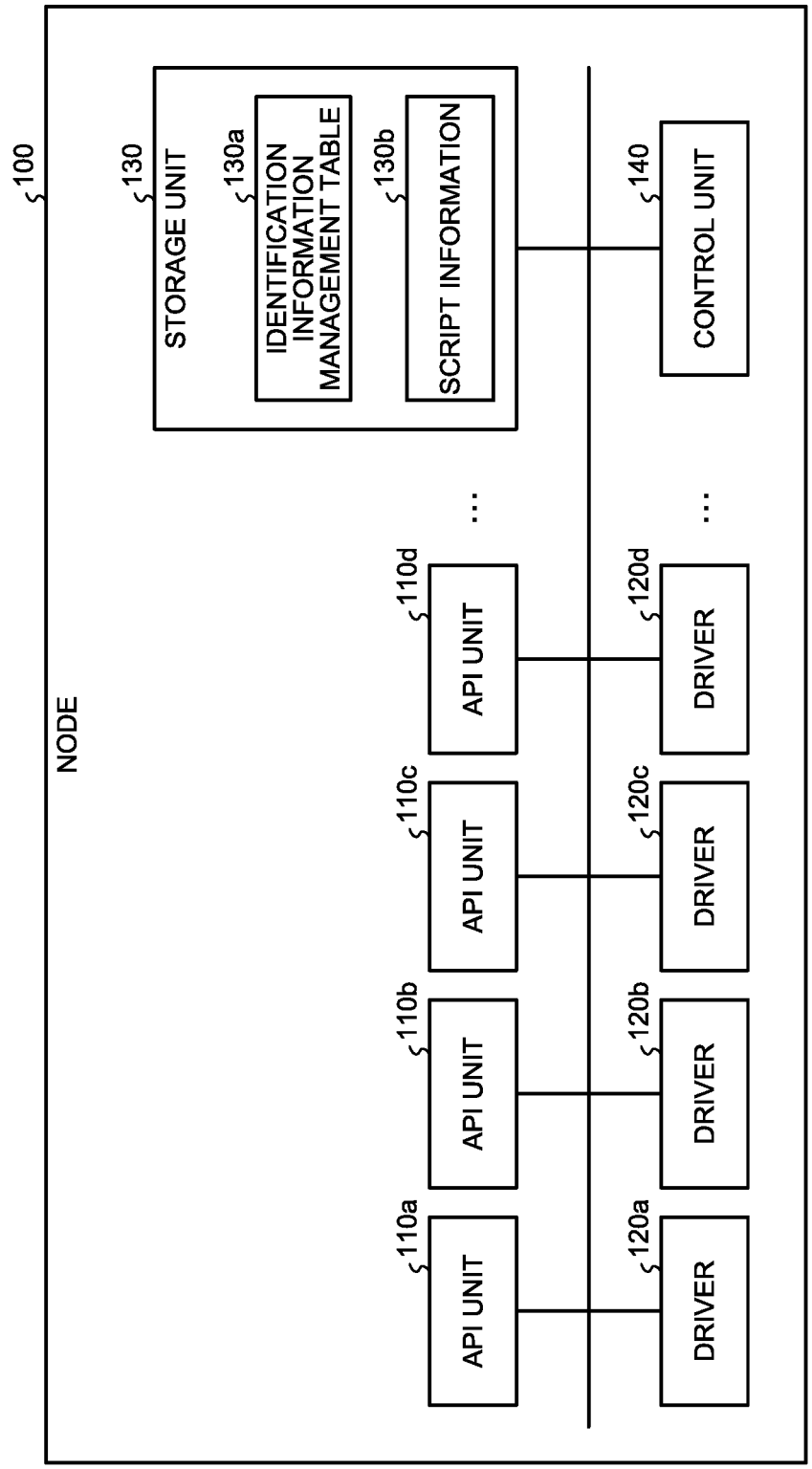
FIG. 10 is a functional block diagram illustrating a configuration of a node according to the present embodiment.

Next, the configuration of each node 100 illustrated in FIG. 1 will be described below. FIG. 10 is a functional block diagram illustrating the configuration of the node according to the present embodiment. As illustrated in FIG. 10, the node 100 includes API units 110*a*, 110*b*, 110*c*, and 110*d* and drivers 120*a*, 120*b*, 120*c*, and 120*d*. The node 100 may include an API unit in addition to the API units 110*a* to 110*d*. The node 100 may include a driver in addition to the drivers 120*a* to 120*d*. The node 100 includes a storage unit 130 and a control unit 140.

The API unit 110*a* is a processing unit that controls the driver 120*a* and acquires environment data from a sensor which is not illustrated when an execution command for sensing is received from the control unit 140. The environment data includes, for example, data such as temperature or humidity.

The driver 120*a* is connected to a sensor. The driver 120*a* is device driver that acquires environment data from the sensor and outputs the environment data to the API unit 110*a*. The sensor corresponds to a temperature sensor, a humidity sensor, or the like.

The API unit 110*b* is a processing unit that controls the driver 120*b* and transmits designated data when an execution command for transmission of data is received from the control unit 140. For example, the API unit 110*b* transmits environment data, power data, script data, and the like. The API unit 110*b* controls the driver 120*b* and receives data when an execution command for reception of data is received from the control unit 140.

The driver 120*b* is connected to a communication device. The driver 120*b* is a device driver that operates the communication device to transmit and receive data.

The API unit 110*c* controls the driver 120*c* and controls supply of power to the node 100 when an execution command for sleep is received from the control unit 140. Note that the API unit 110*c* and the driver 120*c* are normally supplied with power from a power module that supplies power, and it is assumed that supply of power to the API unit 110*c* and the driver 120*c* is maintained even when the supply of power to the node 100 is stopped. For example, when the execution command for sleep for X minutes is received, the API unit 110*c* stops the supply of power to the node 100 for X minutes from the time at which the execution command for sleep is received and then restarts the supply of power.

The API unit 110*d* is a processing unit that controls the driver 120*d* and detects power data of a battery which is not illustrated when an execution command for detection of power data is received from the control unit 140.

The driver 120*d* is connected to the battery. The driver 120*d* detects the power data of the battery and outputs the detected power data to the API unit 110*d*.

The storage unit 130 includes an identification information management table 130*a* and script information 130*b*. For example, the storage unit 130 corresponds to a storage device such as a semiconductor memory device such as a random access memory (RAM), a read only memory (ROM), or a flash memory or a hard disk drive (HDD).

The identification information management table 130*a* is information including node identification information for identifying each node 100, role identification information for identifying a role of each node 100, and group identification information for identifying a group to which each node 100 belongs. Among these, the role identification information is set to one of a leaf node (end device) and a joint node (router).

The script information 130b corresponds to information of a script which is transmitted from the server 50 to the nodes 100. For example, the information of the script is information of the command strings illustrated in FIGS. 4 to 9.

The control unit 140 is a processing unit that performs predetermined processing by controlling the API units 110a to 110d on the basis of the script information 130b. The control unit 140 corresponds to an integrated circuit device such as an application specific integrated circuit (ASIC) or a field programmable gate array (FPGA). The control unit 140 also corresponds to, for example, an electronic circuit such as a central processing unit (CPU) or a micro-processing unit (MPU).

When the script information 130b is received via the API unit 110b, the control unit 140 stores the received script information 130b in the storage unit 130. The control unit 140 refers to the identification information management table 130a and transmits the script information 130b to a neighboring node 100 via the API unit 110b when the corresponding node 100 is a joint node.

An example of processes which are performed by the control unit 140 on the basis of the script information 130b will be described below. When Target included in the script information 130b corresponds to the identification information in the identification information management table 130a, the control unit 140 sequentially executes the corresponding command strings. For example, when the identification information of the node 100 designated by Target matches the node identification information in the identification information management table 130a, the control unit 140 executes the corresponding command strings. When the role of the node 100 designated by Target matches the role identification information in the identification information management table 130a, the control unit 140 executes the corresponding command strings. When identification information of the group to which the node 100 designated by Target belongs matches the group identification information in the identification information management table 130a, the control unit 140 executes the corresponding command strings. Further, when Target is "All node," the control unit 140 sequentially executes the corresponding command strings regardless of the identification information in the identification information management table 130a.

Processing when the control unit 140 executes the scripts a1 and a2 illustrated in FIGS. 4 and 5 will be described below. For example, it is assumed that the role identification information in the identification information management table 130a indicates a "leaf node (end device)." In FIG. 4, since Target of the script a1 matches the role identification information in the identification information management table 130a, the control unit 140 executes the processes of the second to fifth rows. Specifically, the control unit 140 outputs an execution command for sensing to the API unit 110a and performs the process of outputting the execution command for transmission of data to the API unit 110b every 20 seconds. For example, data which is transmitted by the transmission of data corresponds to the environment data which is acquired by the API unit 110a.

In FIG. 5, since Target of the script a2 matches the role identification information in the identification information management table 130a, the control unit 140 performs the processes of the second and third rows. Specifically, the control unit 140 outputs an execution command for sleep (sleep for nine minutes) to the API unit 110c.

Figure 11:
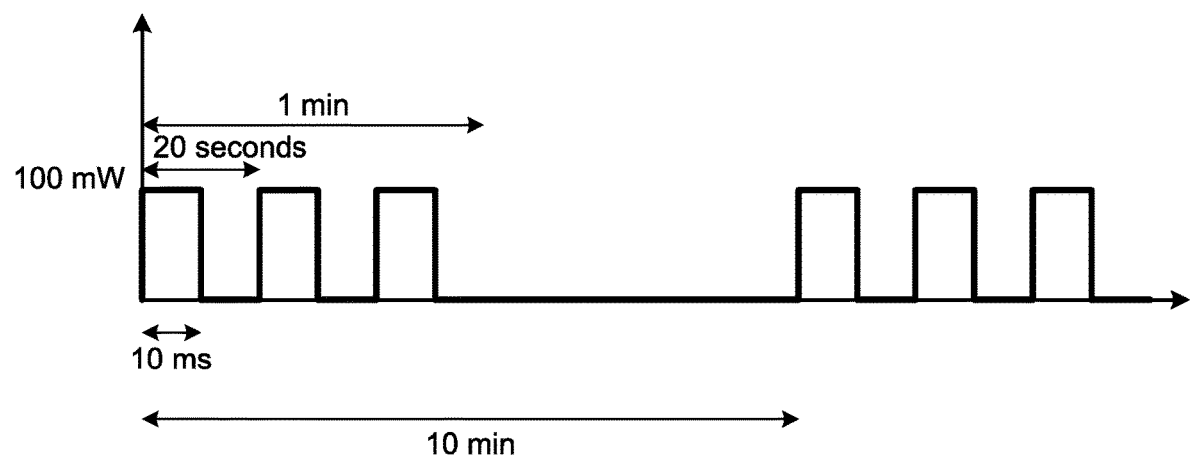
FIG. 11 is a diagram illustrating an example of power consumption of a node when Scripts a1 and a2 are executed.

FIG. 11 is a diagram illustrating an example of power consumption of the node when the scripts a1 and a2 are executed. In FIG. 11, a vertical axis represents power consumption and a horizontal axis represents time. For example, in the example illustrated in FIG. 11, the control unit 140 periodically performs processing of starting the process of the script a2 in one minute after the process of the script a1 is started. As illustrated in FIG. 11, since an execution command for sensing and an execution command for transmission of data are output every 20 seconds, three times of sensing and transmission of data are performed for one minute.

Here, it is assumed that the time for sensing and transmission of data is 10 ms. Then, the node 100 operates for 30 ms in one cycle and operates for 180 ms in one hour. When the power consumption for sensing and transmission of data is 100 mW, the power consumption of the node 100 for one hour is 100 mW×180 ms/3600 s=5×10^(−3) mW. For example, when the power remaining in the battery is 15×10^(−3) mW, it can be seen that the node 100 will depletes power in three hours.

Processing when the control unit 140 executes the scripts b1 and b2 illustrated in FIGS. 6 and 7 will be described below. For example, it is assumed that the node identification information in the identification information management table 130a indicates a "node 100X" and the role identification information indicates a "leaf node (end device) ." In FIG. 6, since Target of the script b1 matches the node identification information in the identification information management table 130a, the control unit 140 performs the processes of the second to fifth rows. Specifically, the control unit 140 outputs an execution command for sensing to the API unit 110a and performs the process of outputting the execution command for transmission of data to the API unit 110b every 60 seconds. For example, data which is transmitted by the transmission of the data corresponds to the environment data which is acquired by the API unit 110a.

In FIG. 7, since Target of the script b2 matches the role identification information in the identification information management table 130a, the control unit 140 performs the processes of the second and third rows. Specifically, the control unit 140 outputs an execution command for sleep (sleep for nine minutes) to the API unit 110c.

Figure 12:
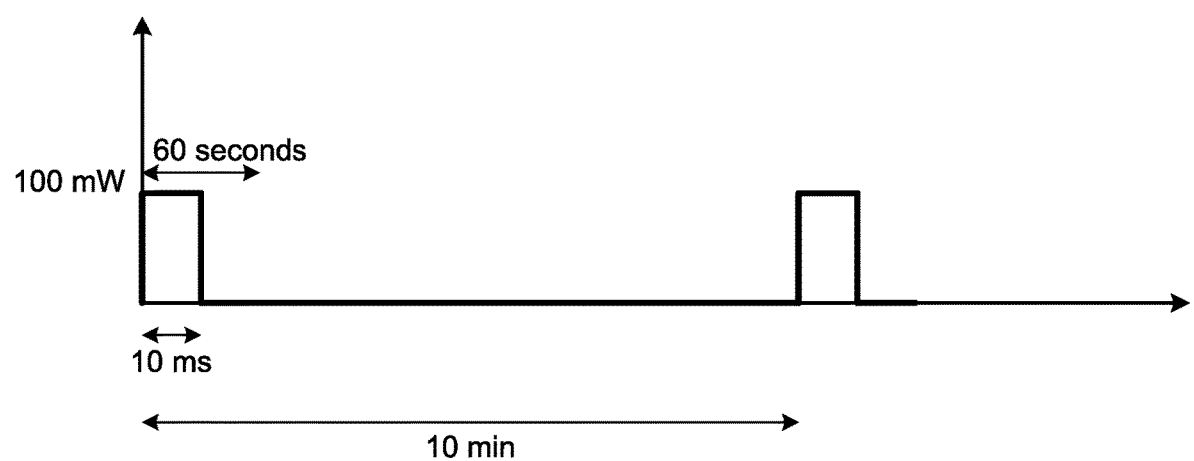
FIG. 12 is a diagram illustrating an example of power consumption of a node when Scripts b1 and b2 are executed.

FIG. 12 is a diagram illustrating an example of power consumption of a node when the scripts b1 and b2 are executed. In FIG. 12, a vertical axis represents power consumption and a horizontal axis represents time. For example, in the example illustrated in FIG. 12, the control unit 140 periodically performs processing of starting the process of the script b2 in one minute after the process of the script b1 is started. As illustrated in FIG. 12, since an execution command for sensing and an execution command for transmission of data are output every 60 seconds, sensing and transmission of data is performed once for one minute.

Here, it is assumed that the time for sensing and transmission of data is 10 ms. Then, the node 100 operates for 10 ms in one cycle and operates for 60 ms in one hour. When the power consumption for sensing and transmission of data is 100 mW, the power consumption of the node 100 for one hour is 100 mW×60 ms/3600 s=1.67×10^(−3) mW. For example, when the power remaining in the battery is 15×10^(−3) mW, it can be seen that the node 100 will depletes power in about nine hours. For example, in comparison with the case described with reference to FIG. 11, the time for power depletion can be extended to about three times in FIG. 12.

Processing when the control unit 140 executes the script c1 illustrated in FIG. 8 will be described below. For example, it is assumed that the group identification information in the identification information management table 130a indicates "group M." In FIG. 8, since Target of the first row matches the group identification information, the control unit 140 executes the command strings of the second to fourth rows. Specifically, the control unit 140 sets the role identification information in the identification information management table 130a to "End device."

Since Target of the fifth row does not match the group identification information, the control unit 140 skips execution of the command strings in the sixth to eighth rows.

Since Target of the ninth row is "All node," the control unit 140 executes the command strings of the tenth to twelfth rows. Specifically, the control unit 140 performs reconstruction of a network. For example, the control unit 140 transmits and receives hello packets to and from a neighboring node 100 using the API unit 110b and reconstructs the sensor network 70. The process of causing the control unit 140 to reconstruct the sensor network 70 may be performed as in a similar way to the related art.

Processing when the control unit 140 executes the script c2 illustrated in FIG. 9 will be described below. For example, it is assumed that the group identification information in the identification information management table 130a indicates "group M." Since Target of the first row does not match the group identification information, the control unit 140 skips execution of the command strings in the second to fourth rows.

Since Target of the fifth row matches the group identification information, the control unit 140 executes the command strings of the sixth to eighth rows. Specifically, the control unit 140 sets the role identification information in the identification information management table 130a to "Router."

Since Target of the ninth row is "All node," the control unit 140 executes the command strings of the tenth to twelfth rows. Specifically, the control unit 140 performs reconstruction of a network. For example, the control unit 140 transmits and receives hello packets to and from a neighboring node 100 using the API unit 110b and reconstructs the sensor network 70.

Meanwhile, in addition to the above-mentioned command strings, a command string for periodically transmitting power data to the server 50 may be stored in the script information 130b. The control unit 140 transmits power data to the server 50 by executing the command string and outputting a command to the API units 110b and 110d.

Figure 13:
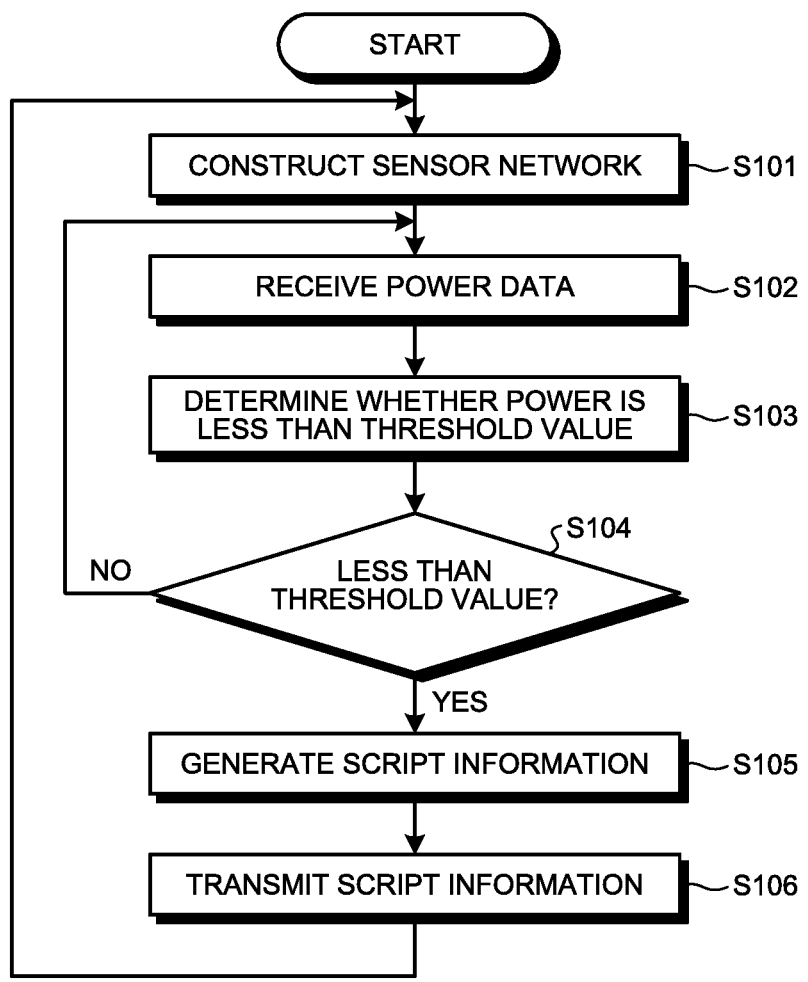
FIG. 13 is a flowchart illustrating an example of a processing routine which is performed by the server.

Next, processing routines which are performed by the server 50 and each node 100 in the control system according to the present embodiment will be described below. FIG. 13 is a flowchart illustrating an example of the processing routine performed by the server. As illustrated in FIG. 13, the server 50 constructs the sensor network 70 by transmitting script information for constructing a network to the nodes 100 of the sensor network 70 (Step S101).

The server 50 receives power data from the node 100 (Step S102). The server 50 determines whether power is less than a threshold value (Step S103). When the power is not less than the threshold value (Step S104, No), the server 50 proceeds to Step S102 again.

On the other hand, when the power is less than the threshold value (Step S104, Yes), the server 50 generates script information (Step S105). The server 50 transmits the script information to the node 100 (Step S106).

Figure 14:
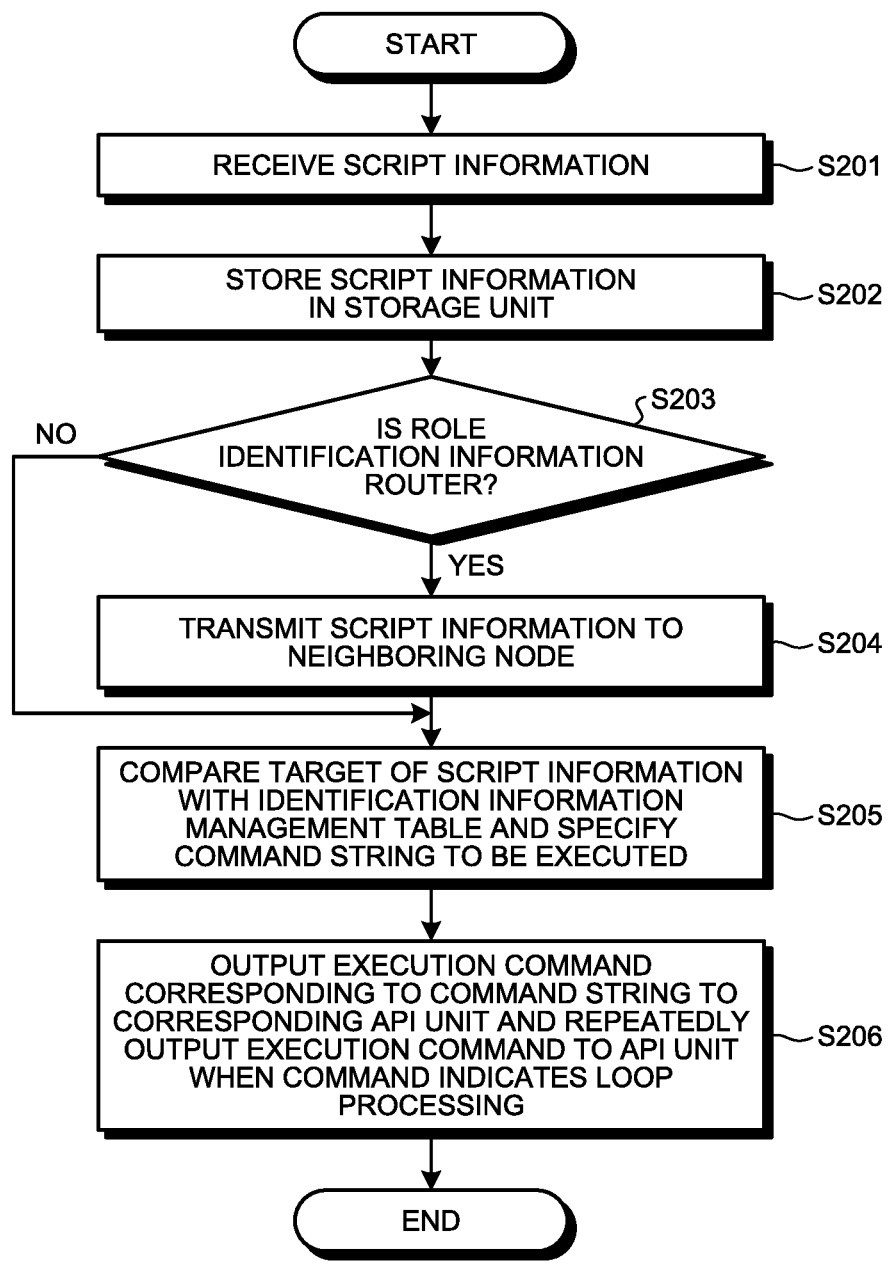
FIG. 14 is a flowchart illustrating an example of a processing routine which is performed by a node.

FIG. 14 is a flowchart illustrating an example of the processing routine performed by the node. As illustrated in FIG. 14, the control unit 140 of the node 100 receives the script information 130b from the server 50 (Step S201). The control unit 140 stores the script information 130b in the storage unit 130 (Step S202).

The control unit 140 determines whether the role identification information is "Router (joint node)" (Step S203). When the role identification information is "Router" (Step S203, Yes), the control unit 140 transmits the script information 130b to a neighboring node (Step S204). When the role identification information is not "Router" (Step S203, No), the control unit 140 proceeds to Step S205.

The control unit 140 compares Target of the script information 130b with the identification information management table 130a and specifies a command string to be executed (Step S205). The control unit 140 outputs an execution command corresponding to the command string to the corresponding API unit. When the command indicates loop processing, the control unit 140 repeatedly outputs an execution command to the API unit (Step S206).

Figure 15:
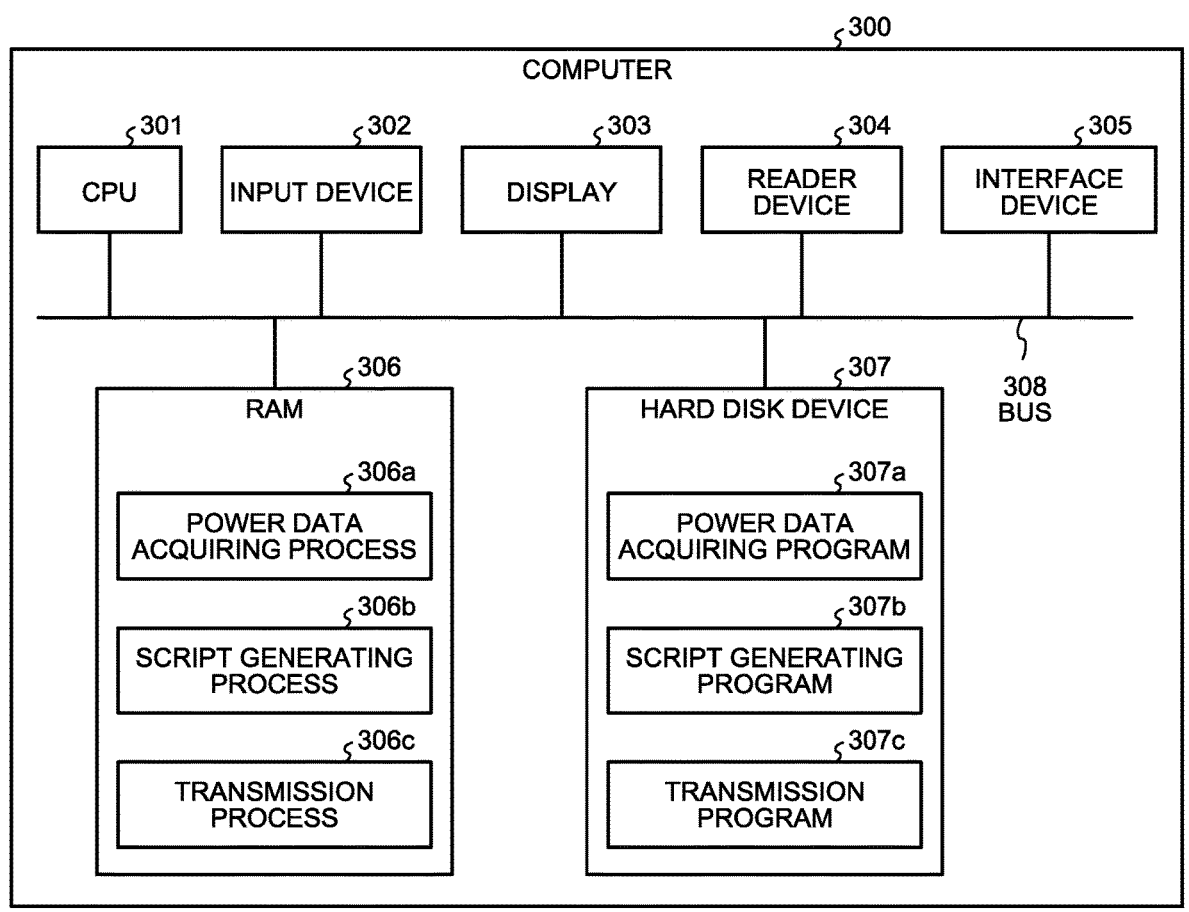
FIG. 15 is a diagram illustrating an example of a computer that executes a control program.

Next, an example of a computer and a hardware configuration that execute a control program for implementing a similar function to the server 50 described in the embodiment. FIG. 15 is a diagram illustrating an example of the computer that executes the control program.

As illustrated in FIG. 15, a computer 300 includes a CPU 301 that performs various arithmetic operations, an input device 302 that receives input of data from a user, and a display 303. The computer 300 also includes a reader 304 that reads a program or the like from a storage medium and an interface device 305 that transmits and receives data to and from another computer via the network. The computer 300 further includes a RAM 306 that temporarily stores a variety of information and a hard disk device 307. The devices 301 to 307 are connected to a bus 308.

The hard disk device 307 includes a power data acquiring program 307a, a script generating program 307b, and a transmission program 307c. The CPU 301 reads the power data acquiring program 307a, the script generating program 307b, and the transmission program 307c and loads the read programs into the RAM 306. The power data acquiring program 307a functions as a power data acquiring process 306a. The script generating program 307b functions as a script generating process 306b. The transmission program 307c functions as a transmission process 306c. For example, the power data acquiring process 306a corresponds to the power data acquiring unit 53a. The script generating process 306b corresponds to the script generating unit 53b. The transmission process 306c corresponds to the transmission unit 53c.

Note that the power data acquiring program 307a, the script generating program 307b, and the transmission program 307c are not necessarily stored in the hard disk device 307 at the initial time. For example, the programs may be stored in a "portable physical medium" such as a flexible disk (FD), a CD-ROM, a DVD disk, an opto-magnetic disk, or an IC card which is inserted into the computer 300. Then, the computer 300 may read and execute the power data acquiring program 307a, the script generating program 307b, and the transmission program 307c.

Figure 16:
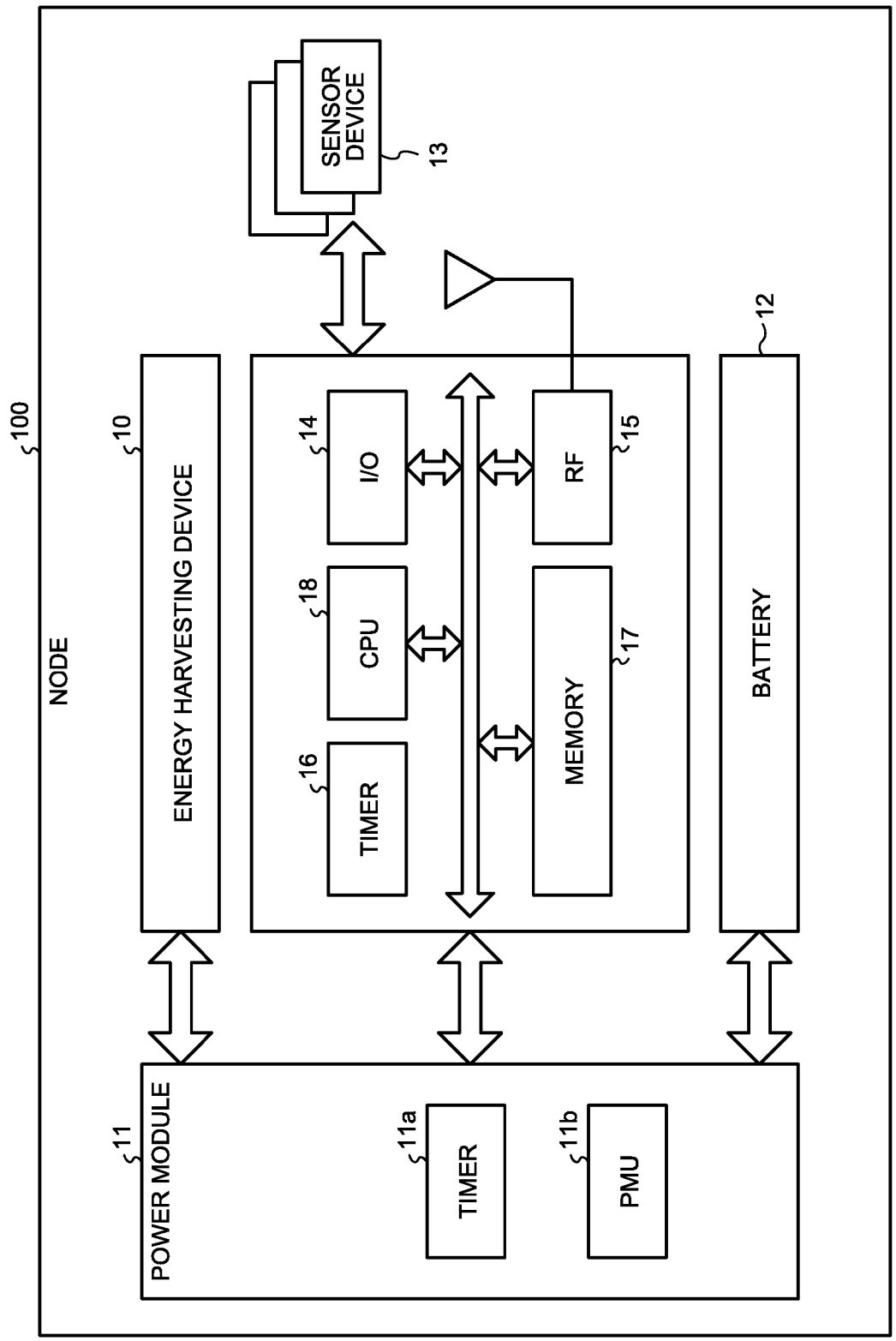
FIG. 16 is a diagram illustrating a hardware configuration of a node.

Next, An example of the hardware configuration of each node 100 described in the embodiment will be described below. FIG. 16 is a diagram illustrating a hardware configuration of the node. For example, the node 100 includes an energy harvesting device 10, a power module 11, a battery 12, a sensor device 13, an I/O (Input/Output) 14, a radio frequency (RF) 15, a timer 16, a memory 17, and a CPU 18.

The energy harvesting device 10 is a device that generates power feebly using environmental radio waves, a temperature, and the like and corresponds to, for example, a solar panel.

The power module 11 is a device that is connected to the energy harvesting device 10 and the battery 12 and allows or prohibits supply of power to the I/O 14, the RF 15, the timer 16, the memory 17, and the CPU 18 of the node 100. The power module 11 includes a timer 11a and a power management unit (PMU) 11b. The timer 11a is a timer that outputs information of time to the PMU 11b. The PMU 11b allows or prohibits supply of power to the I/O 14, the RF 15, the timer 16, the memory 17, and the CPU 18 of the node 100. For example, when an execution command for sleeping for nine seconds is received from the CPU 18, the node 100 is caused to transition to a sleep state by stopping the supply of power to the I/O 14, the RF 15, the timer 16, the memory 17, and the CPU 18 for nine seconds. The battery 12 is a device that accumulates power generated from the energy harvesting device 10.

The sensor device 13 is a device that senses a variety of environment data. The I/O 14 is a device that acquires environment data from the sensor device 13. The RF 15 is a communication device that performs wireless communication with another device. The timer 16 is a timer that outputs time information to the CPU 18. The memory 17 is a storage device that stores a variety of information, and stores, for example, the identification information management table 130a and the script information 130b which are illustrated in the storage unit 130 of FIG. 10. The CPU 18 is a device corresponding to the control unit 140 illustrated in FIG. 10.

Next, effects of the control system according to the present embodiment will be described below. Simply, only the API units, the drivers, and the control structure of sequential processing and loop processing are provided in each node 100 constituting the sensor network 70 and script information covering simple sequential processing and loop processing is notified from a server 50 side to the node 100 to perform the processing. Accordingly, it is possible to reduce operation costs of the sensor network 70.

For example, when all logics are mounted in a node side like a node in the related art, data capacity of 2 MByte is used by the node side. On the other hand, as in the present embodiment, by transmitting script information to the nodes 100 to operate the nodes, data capacity of 8 kByte is used by the node 100 side.

Further, in general, a latent bug rate in software increases in proportion to an amount of mounted resources and an amount of control branches, but script information used in the present embodiment has a small amount of data and thus it is possible to reduce the latent bug rate in comparison with the node in the related art.

Further, in the present embodiment, since the nodes 100 which are likely to deplete power are specified on the basis of the power data acquired from the nodes 100 and the roles or the operation patterns of the nodes 100 are changed using script information, it is possible to prevent power depletion. It is also possible to dynamically change determination logics.

When each node 100 in the present embodiment has a role of a joint node, the node 100 transmits data of command strings received from the server 50 to a neighboring node and it is thus possible to notify the nodes 100 of the sensor network 70 of the script information.

Further, the nodes 100 according to the present embodiment have the group identification information in the identification information management table 130a, and execute command strings of scripts when a group designated by Target in script information matches the group identification information. Accordingly, the server 50 can change roles or operation patterns of the nodes 100 together for each group.

It is possible to prevent an increase in costs for operation of a system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control system comprising:
a plurality of nodes that constitute a network; and
a server,
wherein
the server comprises a server processor that executes a process comprising:
generating data of a command string in a combination of sequential processing and loop processing of repeatedly performing the sequential processing, an execution frequency of the loop processing in the data of the command string being controlled based on information of an amount of power accumulated in a battery of each of the nodes, statistical information of power generation states of the nodes and a time of at least one of sunrise and sunset, and
transmitting the data of a command string to the nodes, and
each of the nodes is operated by a battery charged using a solar panel, and comprises:
a memory that stores the data of the command string received from the server;
a node processor coupled to the memory and configured to provide a plurality of application programming interface units that perform predetermined sequential processing, wherein the node processor executes a process comprising:
selecting the plurality of application programming interface units that perform predetermined sequential processing on the basis of the command string stored in the memory; and
causing the selected application programming interface units to perform sequential processing and loop processing.

2. The control system according to claim 1, wherein the data of the command string is data of a command string in which a process of causing the nodes to acquire data from an external device connected to the nodes, a process of causing the nodes to perform data communication with the server via the network, and a process of controlling power which is supplied to the nodes are described in a combination of sequential processing and loop processing, and the plurality of application programming interface units include an application programming interface unit that acquires data from the external device, an application programming interface unit that performs data communication with the server via the network, an application programming interface unit that controls power which is supplied to the nodes.

3. The control system according to claim 1, wherein the process of the nodes further comprises controlling the application programming interface to transmit the data of the command string received from the server is transmitted to a neighboring node.

4. The control system according to claim 1, wherein the memory stores identification information for identifying a group to which the nodes belong, and the controlling executes the data of the command string when identification information assigned to the data of the command string matches the identification information stored in the memory.

5. A control method comprising:
generating data of a command string in a combination of sequential processing and loop processing of repeatedly performing the sequential processing, an execution frequency of the loop processing in the data of the command string being controlled based on information of an amount of power accumulated in a battery of each of the nodes, statistical information of power generation states of the nodes and a time of at least one of sunrise and sunset, using a processor of the server;
transmitting the data of the command string to the nodes;
charging the battery of each of the nodes using a solar panel;
storing at which the nodes store the data of the command string received from the server in a memory, the nodes including a plurality of application programming interface units that perform predetermined sequential processing respectively;
selecting at which the nodes select a plurality of application programming interface units that perform predetermined sequential processing on the basis of the command string stored in the memory, using a processor of the nodes; and
causing at which the nodes cause the selected application programming interface units to perform sequential processing and loop processing, using the processor of the nodes.

6. The control method according to claim 5, wherein the data of the command string transmitted by the server is data of a command string in which a process of causing the nodes to acquire data from an external device connected to the nodes, a process of causing the nodes to perform data communication with the server via the network, and a process of controlling power which is supplied to the nodes are described in a combination of sequential processing and loop processing, and the plurality of application programming interface units include an application programming interface unit that acquires data from the external device, an application programming interface unit that performs data communication with the server via the network, an application programming interface unit that controls power which is supplied to the nodes.

7. The control method according to claim 5, further comprises controlling at which the nodes control the application programming interface units to transmit the data of the command string received from the server is transmitted to a neighboring node.

8. The control method according to claim 5, wherein the memory stores identification information for identifying a group to which the nodes belong, and the nodes execute the data of the command string when identification information assigned to the data of the command string matches the identification information stored in the storage device.

\* \* \* \* \*